United States Patent [19]

Kauss et al.

[11] Patent Number: 4,966,066
[45] Date of Patent: Oct. 30, 1990

[54] LOAD SENSING SYSTEM WITH INCREASING PRIORITY IN SERIES OF CONTROL VALVES

[75] Inventors: Wolfgang Kauss; Ludwig Muncke, both of Lohr/Main; Dietrich Radtke, Steinfeld-Hausen; Kurt Wittich, Flörsbachtal, all of Fed. Rep. of Germany

[73] Assignee: Mannesmann Rexroth GmbH, Lohr/Main, Fed. Rep. of Germany

[21] Appl. No.: 371,075

[22] Filed: Jun. 26, 1989

[30] Foreign Application Priority Data

Jun. 24, 1988 [DE] Fed. Rep. of Germany ....... 3821416

[51] Int. Cl.$^5$ ........................ F15B 11/00; F15B 13/00
[52] U.S. Cl. ........................................ 91/516; 91/518; 91/532; 60/422
[58] Field of Search ................... 91/514, 516, 517, 518, 91/532; 60/422

[56] References Cited

U.S. PATENT DOCUMENTS

| | | | |
|---|---|---|---|
| 4,057,073 | 11/1977 | Adams | 91/516 X |
| 4,337,620 | 7/1982 | Johnson | 91/516 X |
| 4,345,436 | 8/1982 | Johnson | 60/442 X |
| 4,418,710 | 12/1983 | Johnson | 91/516 X |
| 4,663,936 | 5/1987 | Morgan | 91/516 X |
| 4,665,695 | 5/1987 | Rau et al. | 60/442 X |
| 4,773,216 | 9/1988 | Ohashi et al. | 91/514 X |

FOREIGN PATENT DOCUMENTS 2260457  6/1974  Fed. Rep. of Germany ........ 91/514

Primary Examiner—Edward K. Look
Assistant Examiner—John E. Ryznic
Attorney, Agent, or Firm—Burns, Doane, Swecker & Mathis

[57] ABSTRACT

A hydraulic system is provided for powering a steering unit, a trailer brake and an auxiliary power unit from a single pump. A control circuit ensures that the hydraulic trailer brake and/or the power steering unit on the vehicle will operate on a preferential basis over the auxiliary power unit. The hydraulic control circuit has two priority valves connected in series. The upstream priority valve has a priority position in which it makes the pump fluid available to a supply line for the common priority flow for the steering and braking apparatus and a non-priority position for powering the auxiliary power unit. The common priority flow is passed through the second or downstream priority valve for priority powering of the power steering circuit.

5 Claims, 2 Drawing Sheets

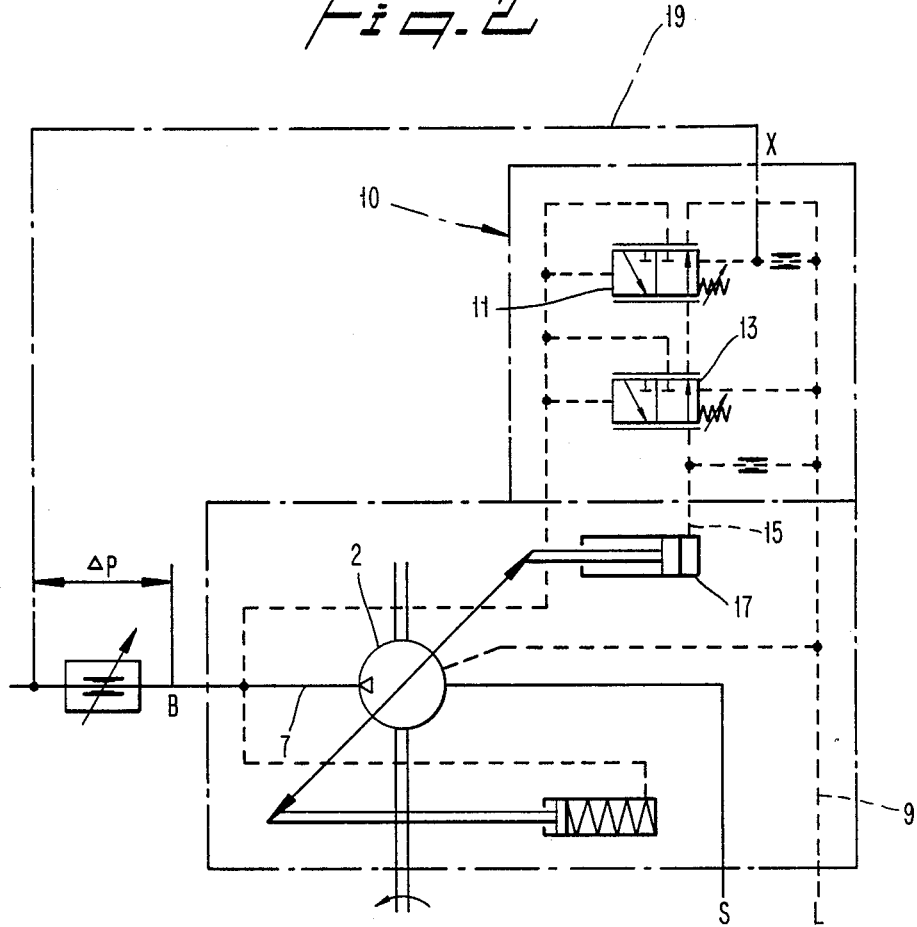

LOAD SENSING SYSTEM WITH INCREASING PRIORITY IN SERIES OF CONTROL VALVES

FIELD OF THE INVENTION

The invention relates to a hydraulic control circuit which controls the order in which certain of a plurality of hydraulically operated devices receive pressurized fluid from a single pump. It is concerned particularly with a hydraulic control circuit for giving both a trailer brake and a power steering unit priority over such auxiliary devices as piston-and-cylinder type lifts with respect to receipt of pressurized fluid from a single pump during periods when both the auxiliary device and either the steering unit or the trailer brake are to be actuated.

BACKGROUND

Safety considerations make it very important that hydraulic brake systems and hydraulic steering apparatus in vehicles be supplied with pressurized hydraulic fluid under conditions such that reliable functioning is assured under all operating conditions. Nevertheless, it is not unusual for even simple hydraulic systems having only a single supply pump to be relied upon additionally to power at least one auxiliary consuming unit, e.g. a piston-and-cylinder device.

In order to ensure reliable powering of the brake system and the steering apparatus on a priority basis, it is common to operate the hydraulic system with the individual consuming units being switched among each other, and being protected from each other's failures by so-called "priority valves".

This customary type of control gives rise to disadvantages. A plurality of priority valves must be laid out in such a way that their response behavior must be well coordinated. Moreover, the volumetric flow range of the fluid extends up to the maximum output flow of the common hydraulic pump. The existence of this boundary condition has heretofore made it difficult to optimize the control circuits with regard to response behavior and space requirements. Consequently, with the above approach it would be necessary in individual cases to make sacrifices in terms of substantial flow losses, i.e., energy losses, in the control circuits.

OBJECTS AND SUMMARY OF THE INVENTION

An object of the present invention is to provide a hydraulic control circuit which will minimize problems of the types encountered heretofore in systems where priority must be established as between plural hydraulic devices or mechanisms which must be supplied with pressurized fluid from a single pump.

A more particular object of the invention is to provide for powering a hydraulic power steering unit and a hydraulic trailer brake on a priority basis through an improved hydraulic control circuit distinguished by reduced energy losses as well as by a simplified structure.

Still another object of the present invention is to provide an improved priority control for a hydraulic system in which a single pump supplies power to a steering unit, a trailer brake and an auxiliary device in such a way that the steering unit has the highest priority and the trailer brake is next in priority.

According to the invention, the priority powering of the steering apparatus and trailer brake is accomplished by two "priority valves" connected in series or cascade fashion. The common priority flow for the steering apparatus and brake is branched off at the upstream priority valve so that only this valve must be designed to accommodate the entire pump flow. The second priority valve need only be designed to accommodate the flow of hydraulic fluid required for the steering apparatus and trailer brake. This provides a new potential for easier optimization of the response behavior. Also, there is the additional advantage, in comparison to customary priority circuits, that it is unnecessary for the entire pump output to pass through the valves involved. With this arrangement, dissipation losses can be substantially reduced, considering that the system for supplying pressurized hydraulic fluid is designed for a throughput much greater than that necessary for the hydraulic circuit of the steering apparatus and trailer brake.

BRIEF DESCRIPTION OF THE DRAWINGS

An exemplary embodiment of the invention will be described in detail below, with reference to the following figures.

FIG. 2 is a circuit diagram of a pressure flow compensator device shown in FIG. 1.

DETAILED DESCRIPTION OF PREFERRED EMBODIMENT

Figure 1:
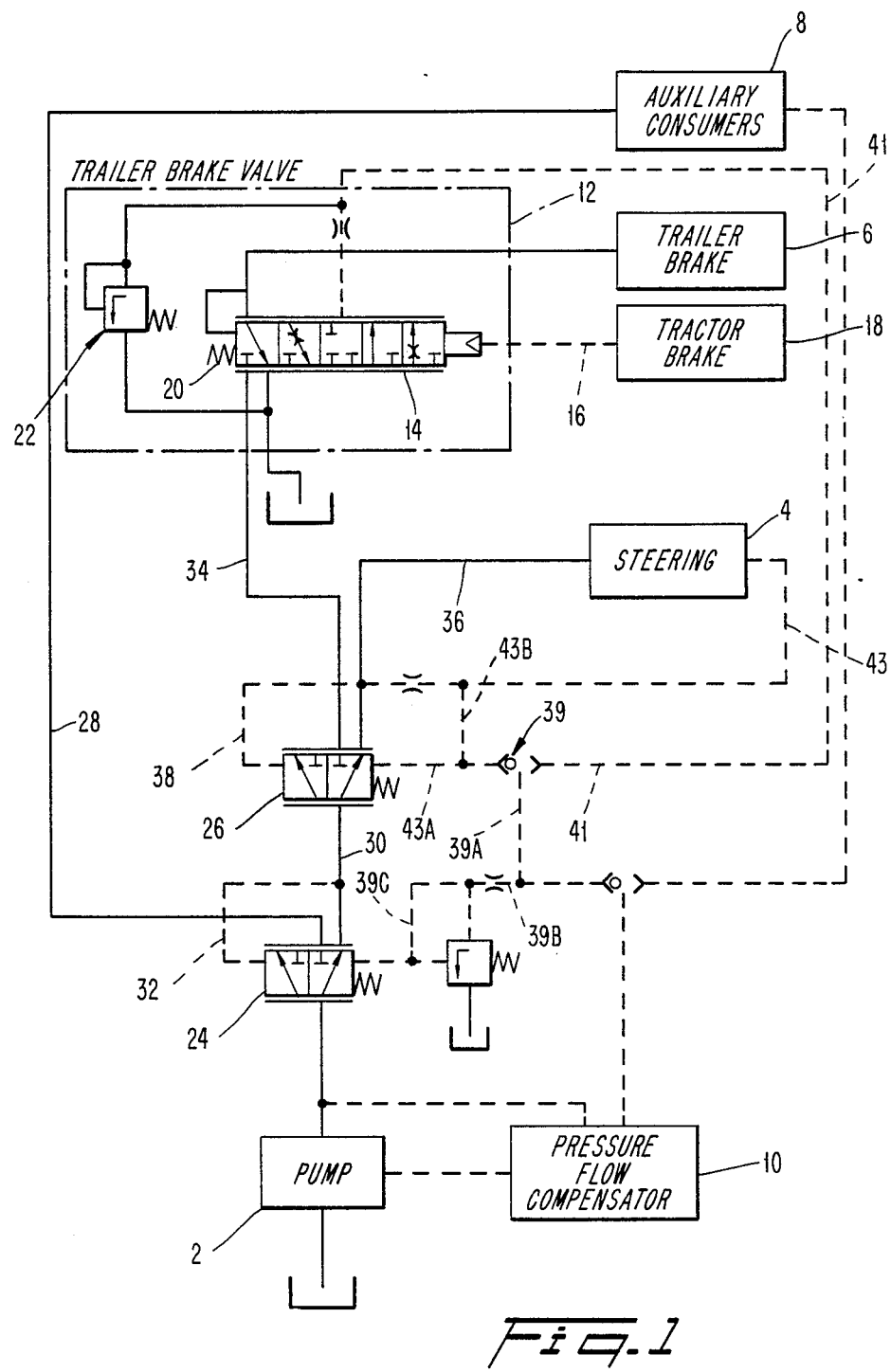
FIG. 1 shows a general block circuit diagram of a hydraulic control circuit for a trailer brake valve.

In FIG. 1, a hydraulic pump 2 supplies the entire hydraulic system of a truck, utility vehicle, or the like, which vehicle has a trailer. In particular, the pump 2 powers a power steering apparatus 4, a trailer brake 6, and at least one auxiliary consuming unit 8 such as a piston-and-cylinder type lifting device. The pump 2 is preferably a regulated variable displacement pump which has associated with it a pressure/flow compensator device 10 controlled by signals from individual load-sensing lines. The control circuit for this type of variable displacement pump is shown in FIG. 2 in which S designates the fluid suction line, L designates a connection for a relief line 9 to the reservoir for conducting leakage fluid from the pump 2 as well as surplus control fluid from the regulating valves 11 and 13. Reference numerals 11 and 13 designate 3/2-servo valves for the pressure control line 15 which supply the control chamber 17 of the variable displacement pump. In addition to providing a pressure regulating function, with this kind of control the supply flow of the pump can be adjusted by using the pressure drop p across the respective hydraulic power consumers, i.e., across a respective metering orifice of this consuming unit. To this end the valve spool of valve 11 serves as a pressure differential control valve which is subjected at one control side by the pressure in pump line 7 and at its other control side by the force of an adjustable spring as well as by the pressure in load-sensing line 19 via the load-sensing connection X. This valve 11 therefore operates the stroke mechanism of the variable displacement pump 2 depending on the control pressure differential.

The trailer brake 6 is powered via a trailer brake valve mechanism 12 depicted in the drawing by a dot-dash line rectangle. The control lines which transmit control pressures in the illustrated embodiment are shown by dash lines in the drawing.

The control spool 14 of the valve 12 is controlled on one side by a control line 16 from a tractor brake circuit shown in block form at 18. On its other side the regulating slide 14 of the valve 12 is exposed to both the pressure downstream of the regulating slide 14 and to the force of a spring 20. A pressure limiting valve 22 limits the maximum pressure in the trailer brake circuit to a predetermined tolerable level.

The powering of the hydraulic fluid consuming units 4, 6 and 8 is on a priority basis which assures that the presence of an auxiliary power unit 8 such as a lift will not detract from the ability of the system to respond promptly to the requirements of the steering apparatus 4 and the trailer brake 6. That is, the auxiliary equipment has a lower priority than either the steering or the braking apparatus.

To power the steering apparatus 4 and the trailer brake 6 on a priority basis, the hydraulic control circuit has two 3/2-way priority valves 24 and 26 connected in series or cascade fashion. The upstream priority valve 24 provides branch paths 28 and 30 for the system volumetric flow delivered by the pump 2. The branch path 28 provides a supply line leading to the auxiliary consuming unit 8, and the other branch path 30 provides a supply line for the steering unit 4 and the trailer brake 6. This latter line 30 is a "priority line"; its pressure is fed back to the valve 24 via control line 32 to exert a control influence on the position of the valve 24 such that this valve will remain in the illustrated condition until the demands of the steering and braking units have been satisfied.

The priority line 30 carries a common priority flow for steering apparatus 4 and trailer brake 6 to the downstream priority valve 26. The valve 26 provides a branch path 34 leading to the trailer brake valve 12, and another branch path 36 leading to the power steering unit 4. The steering circuit pressure which prevails in the hydraulic line 36 is fed back to the spool of the second priority valve 26 via an additional control line 38, so that when the steering circuit is adequately powered there will reliably be an immediate pressurization of the hydraulic line 34 which inputs to the trailer brake circuit.

It is seen from the preceding that the downstream priority valve 26 does not need to be designed to handle the flow of the entire pump output (e.g., 150 liter/minute), but only to handle the priority volumetric flow as required by the power steering circuit and the trailer brake circuit.

Valve 26 acts as a pressure differential control valve which controls the pressure drop across the metering edge of the steering unit at a constant value. As long as the pressure drop is at that value and additional fluid flow is available, this additional fluid flow will be supplied to the trailer brake circuit.

Valve 24 principally acts in the same way controlling the pressure drop either for the steering or for the trailer brake. For this reason a shuttle valve 39 is provided which selects the respective higher load in load sensing lines 41 and 43 respectively. If sufficient fluid flow for brake or steering is available, auxiliary consumers 8 can be supplied by line 28.

As discussed, valve 26 acts as a pressure differential control valve for controlling the pressure drop across the metering edge of the steering unit 4 at a constant value. The valve 26 is spring biased and biased by fluid pressure in lines 43a and 38 so as to switch between a priority position of supplying fluid pressure from line 30 through line 3 to the steering apparatus 4. The valve 26 is capable of moving to the right, as shown in FIG. 1, in order to supply fluid pressure from the conduit 30 through the conduit 34 and, dependent on the position of the valve 14, to the trailer brake 6. The valve 26 is subjected to fluid pressure on the left hand side, as shown in FIG. 1, via conduit 38. The valve 26 is also subjected to the spring pressure on the right hand side as shown in FIG. 1 and to fluid pressure as provided through conduit 43a on the right hand side of the valve via line 43a. The steering apparatus 4 provides an outflow through line 43 to the line 38 through a fixed orifice. The pressure fluid therein is transferred to the left hand side of valve 26 as shown in FIG. 1. The hydraulic fluid in line 43 is also transferred, via line 43b to line 43a to the right hand side of the valve 26 and to a shuttle valve 39. The shuttle valve 39 also receives fluid pressure from line 41 which supplies the pressure to the trailer brake 6. The hydraulic pressure of line 41 is provided to the right hand side of shuttle valve 39.

As discussed, valve 26 gives first priority to the steering apparatus 4. Accordingly, the spring pressure and fluid pressure in line 43b tends to bias the valve 26 to the position shown in FIG. 1 so as to constantly provide for fluid supply to the steering apparatus 4 and a constant pressure drop across the valve 26 through the lines 30 and 36. The second priority of the hydraulic control system is to provide hydraulic pressure to the trailer brake 6. When the pressure in conduit 38 is sufficient to overcome the hydraulic pressure in line 43a and the spring pressure combined therewith, the valve 26 will shift so as to provide hydraulic pressure from line 30 to conduit 34 and, subsequently, to the trailer brake 6. Accordingly, it can be seen that as lines 41 and 43 are load-sensing lines, the hydraulic pressure therein will determine the position of the valve 26. Additionally, the shuttle valve 39 will always select the respective higher load in the load-sensing lines 41 and 43. As such, the shuttle valve 39 will control the position of valve 24 so as to determine whether or not hydraulic pressure will be supplied to the auxiliary consumers, e.g., lifts, identified at reference numeral 8.

The invention obviously is not limited to the precise control circuit embodiment illustrated in the drawing. Various modifications will suggest themselves readily. Generally, instead of the trailer brake circuit, another consuming unit may be controlled in the manner according to the invention, so that the powering of that unit will have priority over that of another consuming unit. Also, more than one of the auxiliary consuming units may be in the system and supplied from line 28.

Thus, the invention makes available a hydraulic control circuit for powering from a single pump multiple hydraulic fluid consuming units according to a priority hierarchy in which an auxiliary unit has the lowest standing, a power steering unit has the highest priority and a trailer brake has an intermediate standing. To ensure that the hydraulic brake apparatus and/or the power steering unit on the vehicle will operate on a preferential basis over the auxiliary consuming units, the hydraulic control circuit has two priority valves connected in series or cascade fashion. In the priority setting of the upstream priority valve, the pump output will be available to supply the power steering unit or the trailer brake. This common priority flow is passed through the downstream priority valve for priority powering of the steering circuit. After the existing demands from both the steering circuit and the trailer brake have been satisfied, the upstream priority valve may move to an alternative location wherein the pump output supplies the auxiliary consuming unit(s).

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A hydraulic control circuit for at least two priority consuming units which are to be powered on a priority basis from a pump that is also relied upon to power at least one auxiliary consuming unit, said hydraulic control circuit comprising:
   a first priority valve being supplied by said pump and having;
      a priority position in which the fluid supplied by said pump is made available to a priority line for supplying the demands of said priority consuming units, and
      a non-priority position in which the fluid supplied by said pump is made available to supply the demands of said auxiliary consuming units; and
   a second priority valve connected to said priority line so as to be in series with said first priority valve, said second priority valve having;
      a first position in which fluid from said priority line is made available to satisfy the demands of a most preferred one of said priority consuming units, and
      a second position in which fluid from said priority line is made available to satisfy the demands of a less preferred one of said priority consuming units.

2. A hydraulic control circuit according to claim 1, wherein said most preferred priority consuming unit is a power steering apparatus and said less preferred priority consuming unit is a trailer brake.

3. A hydraulic control circuit according to claim 2, wherein the amount of the common priority flow for the power steering apparatus and the trailer brake is a fraction of the total controllable flow volume from the pump to said first priority valve.

4. A hydraulic control circuit according to claim 3, wherein the second priority valve is controlled by a load indicating line from the power steering apparatus so that said second priority valve moves from its first position to its second position after the demands of said power steering apparatus have been met.

5. A hydraulic control circuit according to claim 2, wherein the second priority valve is controlled by a load indicating line from the power steering apparatus so that said second priority valve moves from its first position to its second position after the demands of said power steering apparatus have been met.

* * * * *